(12) United States Patent
Burri et al.

(10) Patent No.: US 9,843,065 B2
(45) Date of Patent: Dec. 12, 2017

(54) BATTERY WITH STRUCTURED SURFACE

(71) Applicant: The Swatch Group Research and Development Ltd, Marin (CH)

(72) Inventors: Yves Burri, Epalinges (CH); Michael Stalder, Bienne (CH); Jean-Claude Martin, Montmollin (CH)

(73) Assignee: The Swatch Group Research and Development Ltd, Marin (CH)

( * ) Notice: Subject to any disclaimer, the term of this patent is extended or adjusted under 35 U.S.C. 154(b) by 77 days.

(21) Appl. No.: 14/575,166

(22) Filed: Dec. 18, 2014

(65) Prior Publication Data
US 2015/0180080 A1 Jun. 25, 2015

(30) Foreign Application Priority Data
Dec. 19, 2013 (EP) .................... 13198570

(51) Int. Cl.
*H01M 10/02* (2006.01)
*H01M 2/10* (2006.01)
*H01M 10/42* (2006.01)
*H01M 6/50* (2006.01)
*H01M 2/02* (2006.01)
*H01M 6/02* (2006.01)
*H01M 10/48* (2006.01)

(52) U.S. Cl.
CPC ............ *H01M 10/02* (2013.01); *H01M 2/02* (2013.01); *H01M 2/0222* (2013.01); *H01M 2/0267* (2013.01); *H01M 2/1016* (2013.01); *H01M 6/02* (2013.01); *H01M 6/50* (2013.01); *H01M 10/425* (2013.01); *H01M 10/488* (2013.01); *H01M 2/1044* (2013.01); *H01M 10/4221* (2013.01)

(58) Field of Classification Search
CPC .......... H01M 10/02; H01M 2/02; H01M 6/02
USPC ......................................... 429/185
See application file for complete search history.

(56) References Cited

U.S. PATENT DOCUMENTS 5,202,199 A 4/1993 Mizutani et al.
5,418,088 A * 5/1995 Alexandres ........ B23K 26/0838
372/10

FOREIGN PATENT DOCUMENTS

| JP | 3-297053 | 12/1991 | |
|---|---|---|---|
| JP | 2000-113864 | 4/2000 | |
| JP | 2003-217533 | 7/2003 | |
| JP | 2008-12567 | 1/2008 | |
| WO | WO2013112536 A1 * | 8/2013 | ............ H01M 10/48 |

OTHER PUBLICATIONS

Ebner, M., Science, vol. 342, Nov. 8, 2013, pp. 716-720.*
(Continued)

*Primary Examiner* — Victoria Lynch
(74) *Attorney, Agent, or Firm* — Oblon, McClelland, Maier & Neustadt, L.L.P.

(57) ABSTRACT

The present invention concerns a battery including an anode case, an anode situated inside the anode case, a cathode case fixed to the anode case, a seal sealing the cathode case to the anode case, a cathode situated inside the cathode case between the anode and the cathode case, and a membrane between the anode and the cathode, said battery being characterized in that one outer surface of said accumulator includes at least one marking created by local heating of material, said marking being electrically conductive.

20 Claims, 3 Drawing Sheets

(56) References Cited

OTHER PUBLICATIONS

Ong, J., Apple, Aug. 19, 2013, p. 1.*
European Search Report dated Apr. 25, 2014, in European Application No. 13198570 filed Dec. 19, 2013 (with English Translation).

* cited by examiner

BATTERY WITH STRUCTURED SURFACE

This application claims priority from European patent application No. 13198570.7 filed Dec. 19, 2013, the entire disclosure of which is hereby incorporated herein by reference.

The present invention concerns a primary cell or an accumulator including an anode case, an anode situated inside the anode case, a cathode case joined to the anode case, a seal sealing the cathode case to the anode case, a cathode situated inside the cathode case between the anode and the cathode case, and a membrane separating the anode and the cathode.

PRIOR ART

There are known electrical energy accumulators such as button cells for powering electrical devices such as watches or calculators shown in FIG. 1. These button cells 1 include an anode case 2, an anode 4 situated inside the anode case, a cathode case 3 joined to the anode case 2, a seal 6 sealing the cathode case to the anode case, a cathode 5 situated inside the cathode case between the anode and the cathode case, and a membrane 7 separating the anode and the cathode.

To distinguish between the various types of button cells, markings 8 are made on one of the external surfaces of the cell, namely on the cathode case surface or on that of the anode case.

These markings may be made in various different ways. A first method consists in using an ink 8a or a paint which is deposited on one of the surfaces of the battery. This method has the advantage of being simple and easy to adapt. Indeed, it is easy to change from a marking for a first type of battery to a marking for a second type of battery.

However, a first drawback of this solution is ensuring good adhesion of the layer to the battery case. Another drawback is that the paint or ink on the battery can easily be erased or scratched. Indeed, these batteries are handled without care, may be dropped or undergo mechanical wear causing the appearance of scratches or deformations which deteriorate the ink or paint. If the deposited layer deteriorates, the ink or paint residue may come away from the battery surface and pollute the electrical contact or disrupt normal operation of the device.

Further, this use of ink or paint has the drawback of decreasing the contact area of the battery, and the marking must therefore be formed in such a way that it does not prevent electrical contact occurring. One solution consists in using a more expensive conductive paint or ink, which still has the aforementioned drawbacks but also limits the choice of colour to shades where grey-blacks are dominant.

Another solution consists in forming a marking 8b, 8c by stamping. This method consists in plastically deforming the anode case, or more conventionally the cathode case, with the aid of a punch press. Stamping can produce a marking 8b which will be visible from the other side of the case or simply a marking 8c by crushing material. However, this method has the drawback of involving more complex management. Indeed, a different punch is required for each marking.

Consequently, this involves a complex battery manufacturing process wherein the punch must be changed with each change of marking or wherein the series of batteries with one or more specific markings are made in succession.

SUMMARY OF THE INVENTION

The invention concerns an electrical energy accumulator such as an electric cell battery which overcomes the afore-mentioned drawbacks of the prior art by proposing a battery able to accommodate a simple and durable marking which does not impair the electrical contact with the battery.

To this end, the invention concerns a battery or an accumulator including an anode case, an anode situated inside the anode case, a cathode case fixed to the anode case, a seal sealing the cathode case to the anode case, a cathode situated inside the cathode case between the anode and the cathode case, and a membrane between the anode and the cathode, the anode case and the cathode case that are fixed to each other respectively having a first outer surface and a second outer surface, a third outer surface being secant with said first and second surfaces and acting as an edge of said accumulator, said accumulator being characterized in that one of the outer surfaces of said accumulator includes at least one marking created by local heating of the material, said marking being electrically conductive, said marking being a charge state monitoring device, said marking including a plurality of grooves forming a diffraction grating, said grooves deforming when the surface on which the grating is arranged deforms under the effect of the discharge of said accumulator or of the charge/discharge of said accumulator.

In a first advantageous embodiment, said local heating of the material forming the marking removes material.

In a second advantageous embodiment, said local heating of the material forming the marking is performed by laser.

In a third advantageous embodiment, said marking extends over at least any one of the outer surfaces of said accumulator.

In a fourth advantageous embodiment of the invention, said local heating of material by laser is performed such that the marking has a colour that contrasts with the material of the surface to which said marking is applied.

In another advantageous embodiment of the invention, said local heating of material by laser is performed such that the marking has an identical colour to that of the material of the surface to which said marking is applied.

In another advantageous embodiment of the invention, said marking includes a plurality of grooves forming a diffraction grating allowing the creation of an interference effect to give said marking a colour.

In another advantageous embodiment of the invention, said accumulator further includes a second marking, said marking being a decorative image.

In another advantageous embodiment of the invention, said accumulator further includes a second marking, said marking being an anti-counterfeit device.

In another advantageous embodiment of the invention, the anti-counterfeit device includes a combination of several recesses of different surface dimensions forming a unique arrangement.

In another embodiment of the invention, the anti-counterfeit device includes a combination of several recesses arranged parallel to each other, the space between two recesses and the width of said recesses being heterogeneous to form a unique arrangement.

In another advantageous embodiment of the invention, the marking is a charge state monitoring device, said marking including a plurality of grooves forming a diffraction grating, said grooves being deformed when the surface on which the grating is arranged is deformed under the effect of the charge or discharge of said accumulator.

In another advantageous embodiment of the invention, the battery further includes at least one non-electrically conductive marking.

The invention also concerns an electronic apparatus including a closed case which contains an electronic module, said case including a hatch closed by a hatch cover in which an accumulator for electrically powering the electronic module may be arranged, the accumulator being an accumulator according to any of the preceding claims.

In an advantageous embodiment of the invention, the hatch cover is made of transparent material to allow the marking of said accumulator to be seen.

In an advantageous embodiment of the invention, the case of said accumulator includes a decoration and the marking of said accumulator is achieved such that said decoration and said marking combine to form an attractive assembly.

BRIEF DESCRIPTION OF THE DRAWINGS

Other advantages and features of the battery according to the present invention will appear more clearly upon reading the following detailed description of embodiments of the invention, given solely by way of non-limiting example and illustrated by the annexed drawings, in which.

DETAILED DESCRIPTION OF THE INVENTION

Figure 1:
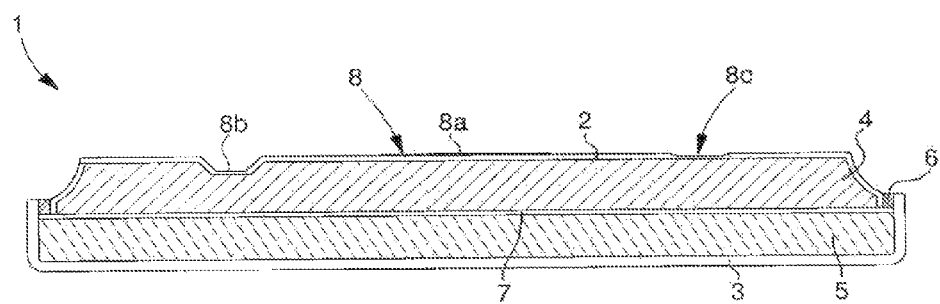
FIG. 1 is a schematic view of a battery according to the prior art.
Figure 2:
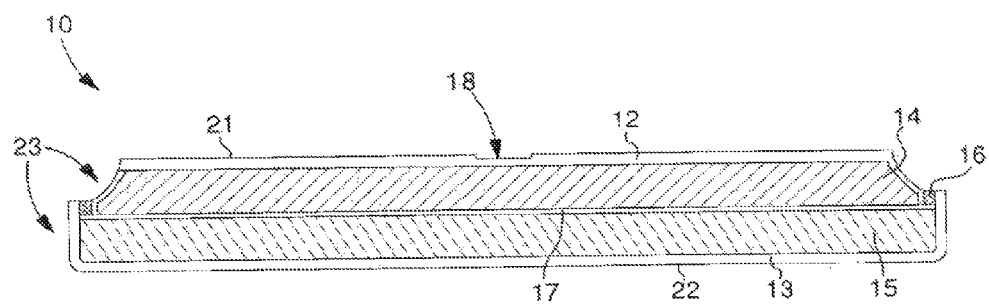
FIG. 2 is a schematic cross-section of a battery according to the invention.

FIG. 2 shows an electrical energy accumulator 10 as a battery according to the invention; said battery 10 may or may not be rechargeable. This battery 10 is, for example, a button cell and includes an anode case 12 containing an anode 14. The battery further includes a cathode case 13 fixed to anode case 12. To ensure sealing between anode case 12 and cathode case 13, a seal 16 sealing cathode case 13 to anode case 12 is used.

A cathode 15 is situated inside cathode case 13 between anode 14 and cathode case 13. A membrane 17 is arranged to be situated between anode 14 and cathode 15. Anode case 12 has a first outer surface 21 while cathode case 13 has a second outer surface 22. For example, the first outer surface 21 and the second outer surface 22 are parallel to each other. Battery 10 further includes a third outer surface 23 secant with these first 21 and second 22 surfaces; this third surface 23 forms the edge of battery 10 and consists of a part of anode case 12 and a part of cathode case 13. However, first outer surface 21 and second outer surface 22 may not be parallel and could be curved.

This battery 10 is intended to be placed in an electronic apparatus 100, such as a watch or a calculator. Electronic device 100 includes a case 101 in which an electronic module is arranged. This electronic module is powered by said battery 10. Case 101 is made so as to have, in its back cover 102, a hatch 103 in which battery 10 is placed for electrical connection to the electronic module. This hatch 103 is closed by a battery hatch cover 104. In general, when battery 10 is arranged in its hatch 103, a surface becomes visible to the user. However, it is possible for electronic apparatus 100 to allow several surfaces of battery 10 to be seen. The electrical contact occurs via the opposite surface to the surface seen by the user, generally the second outer surface 21, namely the anode, and via the part of the cathode case of third outer surface 23 acting as an edge of battery 10 through contactors that generally take the form of elastic metal strips.

Advantageously according to the invention, battery 10 has a marking 18. This marking 18 achieved by local heating of material. In a first embodiment, the local heating of material involves the removal of material from one of the surfaces of battery 10. This removal of material is achieved by laser engraving, i.e. a laser beam is directed onto a desired area. The material is then melted and vaporised by the laser. This use of laser engraving has the advantage of providing a simpler battery marking process since only the laser programming changes between one marking 18 and another. Further, this method makes it possible to obtain an engraving depth of 10 to 200 nm, which is impossible to obtain by stamping. The laser engraving makes it possible to achieve very good adhesion of the marking since it is integrated in the material of the case.

Preferably, marking 18 is made such that it is electrically conductive. To achieve this, the laser engraving is performed at ambient atmosphere so as to limit the fall in conductivity (by oxidation between the oxygen in air and the material) to a value with no impact on the battery performance, i.e. negligible with respect to its internal resistance.

With a conductive marking 18, marking 18 can extend over any surface of the battery. This electrically conductive marking 18 may extend over the first outer surface 21, second outer surface 22 or third outer surface 23. Of course, marking 18 may extend over all of the surfaces simultaneously. The advantage of this type of marking 18 is that there are no constraints on its arrangement or surface. Indeed, since marking 18 does not impair the electrical contact, its shape is limited only by the available surface.

According to a characteristic of the invention, marking 18 according to the invention may be colourless or coloured. This colouring or absence of colour depends on the parameters of the laser engraving method. These parameters are the beam intensity, signal type (pulsed or continuous), pulse duration, atmosphere during engraving, etc.

The advantage of having a marking 18 with a black colour is that it provides a contrast between the material of battery 10, i.e. of anode case 12 and/or cathode case 13 and said marking 18. This contrast thus means that marking 18 stands out and attracts attention.

Conversely, the absence of colour means that marking 18 has the same colour as the bare material of the case of battery 10 so that it is virtually invisible and can therefore conceal basic information which does not need to be seen at first glance.

In a second embodiment, the local heating of material is performed at a temperature which does not permit removal of material but simply colouring of the battery material. Colouring with different colours is achieved by choosing the method parameters, such as temperature, necessary to obtain the desired colour. This technique, called colour change marking can be performed by laser. In this manner, the types of adjustment already used for ablation marking are also used, namely: beam width, beam type, beam frequency, marking atmosphere, etc.

Figure 3:
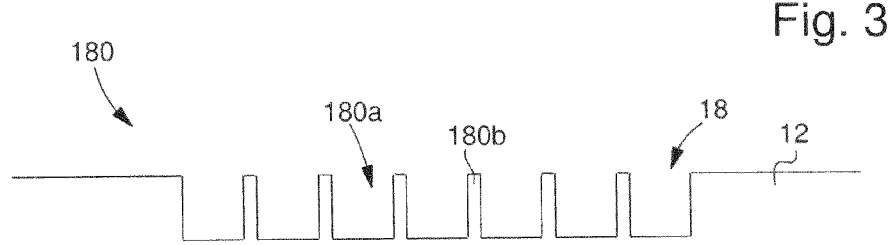
FIGS. 3 and 4 are cross-sectional views of a variant marking of the battery according to the invention.

In a variant seen in FIG. 3, it is possible to create a marking 18 with a colour other than black or that of the material of the bare battery. To achieve this, the laser engraving method is used to engrave a diffraction grating 180. This diffraction grating 180 is formed of a multitude of grooves 180*a* parallel to each other.

Figure 4:
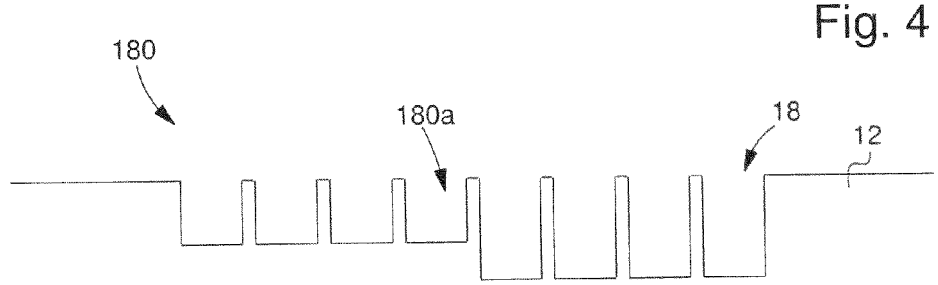

These grooves 180*a* are defined by their shape and their dimensions. Grooves 180*a* cause diffuse light reflection. An interference effect is created during specular reflection which occurs at the top of the crenels 180*b* on the non-engraved surface of the grating, which has a multitude of small mirrors. This is therefore the same physical configuration as a network of slots. The width of crenels 180*b* is equivalent to the opening of the slots whereas grooves 180*a* are equivalent to the space between the slots. The space between the crenels may be varied, area-by-area, so as to obtain a mosaic of colours (like a peacock feather) as seen in FIG. 4. The border between these areas will be blackish/chaotic, therefore areas having a certain surface area inside which spacing remains regular are required.

Figure 5:
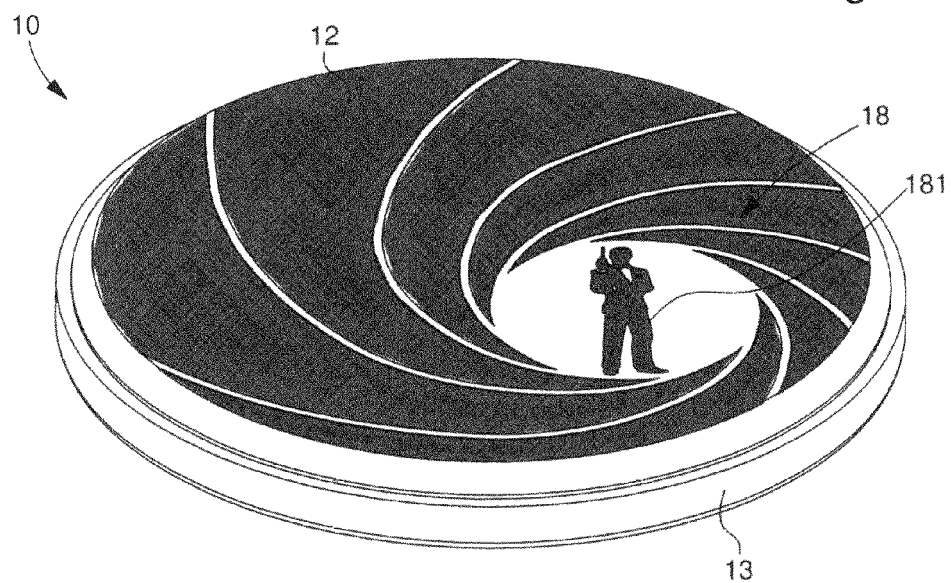
FIG. 5 is a perspective view of a first application of the battery according to the invention.

In a first application, these markings 18 are used to form attractive figures 181 or decorative images as seen in FIG. 5. To this end, the attractive figure(s) 181 are made on the surface(s) of the battery seen by the user when battery 10 is in its hatch 103. These attractive figures 181 may easily be used to make limited editions.

Figure 6:
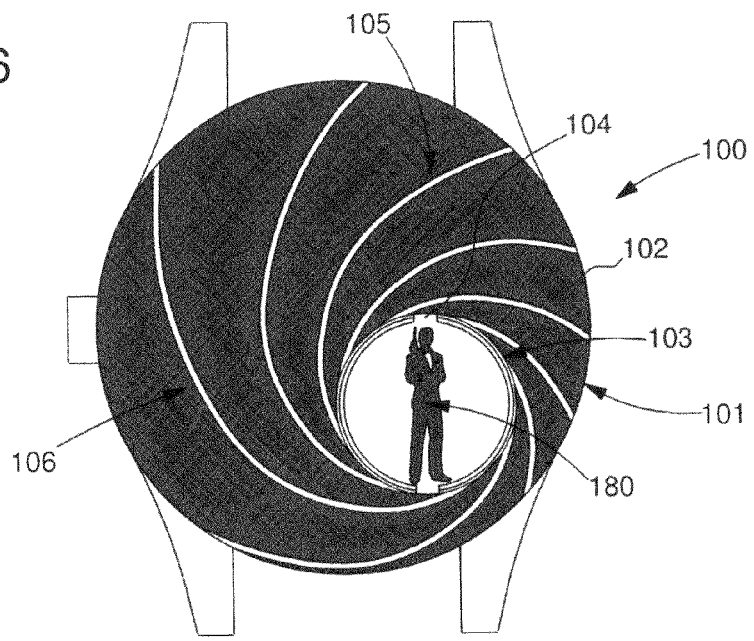
FIG. 6 is a view of the back cover of a watch case having a marking in the first application of the battery of the invention.

Further, the attractive figure or figures 181 can be integrated in a larger attractive assembly as seen in FIG. 6. It is possible to envisage having a case 101 for device 100 which includes battery 10 with a decoration 105 and for battery 10 to be a component of decoration 105. To achieve this, marking 18 of battery 10 is devised to cooperate with decoration 105 of case 101 and to form an attractive assembly 106. For example, if case 101 has a decoration consisting of stars forming a specific constellation (not shown), marking 18 of battery 10 may take the form of one or more stars arranged so that said constellation is represented perfectly once battery 10 is in hatch 103. Likewise, it may be provided that a logo, such as that linked to the famous secret agent 007® is created: the gun barrel picture being decoration 105 of case 101 while the human figure forms marking 18.

On the other hand, the attractive figure 181 may simply be the manufacturer's logo or indications concerning the features of battery 10 such as the cell type or voltage that it produces. In that case, marking 18 could be colourless so as not to be too visible, especially if it is associated with another marking 18 serving as attractive figure 181. In this application, attractive figure 181 may include a diffraction grating 180 to improve its appearance.

This first application is associated with the advantageous solution of having a battery hatch cover 104 made of a transparent material. This transparency allows the user to see markings 18 of battery 10 when he wishes and not only when battery 10 is changed.

In a second application, the marking(s) 18 are utilised for an anti-counterfeit use. This anti-counterfeit marking may take various forms.

A first form consists in creating a serial number. The serial number is preferably colourless, i.e. the same colour as the bare material of the battery so as to be more difficult to detect.

Figure 7:
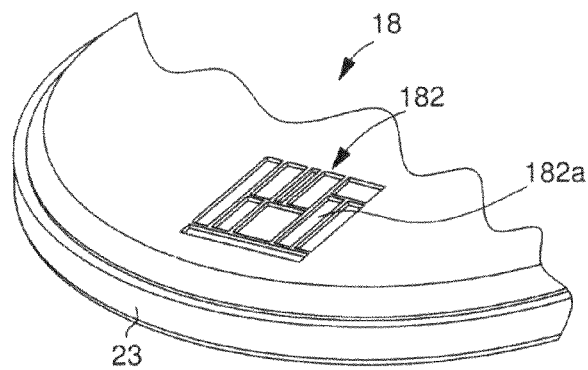
FIG. 7 is a perspective view of a second application of the battery according to the invention.

A second form of anti-counterfeit marking 18 consists of specific structuring such as a barcode 182 as seen in FIG. 7. The barcode may be two-dimensional, i.e. with laser engraving, it is possible to envisage making a series of recesses 182*a* which may be shallow or deep, wide or narrow and long or short, and which for example form a square. This specific combination is preferably made in a colourless marking to be as inconspicuous as possible. Barcode 182 can then be scanned to check the authenticity of battery 10.

A conventional barcode formed of a plurality of parallel recesses 182*a*, of the same depth but with different widths and spacing could also be engraved.

In a variant of this second form of anti-counterfeit marking 18, each of recesses 182*a* may include a diffraction grating 180 to obtain a coloured barcode 182. One advantage of marking and removing material by laser is that it is more reliable than printing, since said barcode has to be filed down to be removed and therefore leaves a mark.

According to a third application, markings 18 are used to form a charge indicator 183 for a battery 10. Indeed, depending upon whether battery 10 is completely charged or discharged, the profile of the battery changes. More specifically, the profile of the first external surface 21 or the second external surface 22 has a different appearance when battery 10 is completely discharged.

Figure 8A:
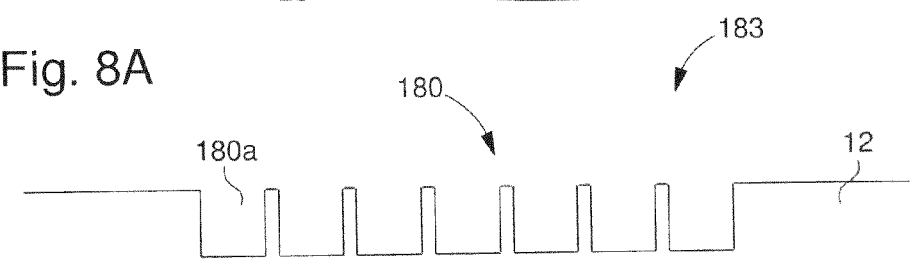
FIGS. 8A and 8B are cross-sectional views of a third application of the battery according to the invention.

Cleverly, according to the invention charge indicator 183 for a battery 10 consists of a diffraction grating 180 on the surface of battery 10 which deforms. This diffraction grating 180 is formed of a plurality of grooves 180*a* parallel to each other. As explained above, this grating breaks down the light into different wavelengths which propagate distinctly from each other as seen in FIG. 8A.

Figure 8B:
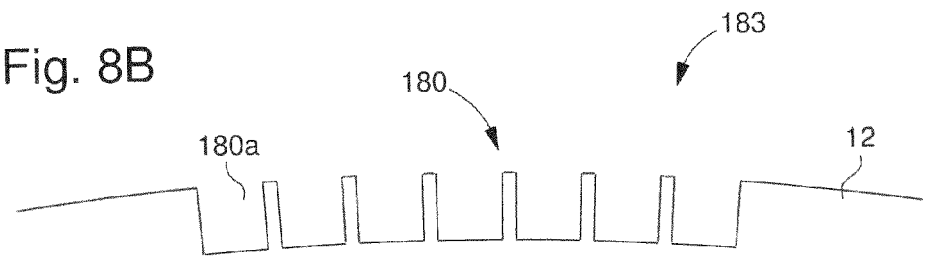

Thus, when battery 10 is discharged, the surface, here the surface of anode case 12, on which diffraction grating 180 is made, deforms as seen in FIG. 8B. This causes a modification in the spacing of diffraction grating 180. Consequently, light is perturbed differently and the colour is modified. Thus, this colour change provides a visual indication of the state of charge.

It will be clear that various alterations and/or improvements and/or combinations evident to those skilled in the art may be made to the various embodiments of the invention set out above without departing from the scope of the invention defined by the annexed claims.

In a second variant, battery 10 further includes a marking made so as to be non-electrically conductive. To achieve this, the laser engraving is performed in an oxygen atmosphere. This has the effect of oxidising the engraved surface and of reducing conductivity sufficiently to disrupt the flow of electricity.

What is claimed is:

1. An electrical energy accumulator comprising:
   an anode case,
   an anode situated inside the anode case,
   a cathode case fixed to the anode case,
   a seal sealing the cathode case to the anode case,
   a cathode situated inside the cathode case between the anode and the cathode case, and
   a membrane between the anode and the cathode, the anode case and the cathode case that are fixed to each other respectively have a first outer surface and a second outer surface, a third outer surface being secant with said first and second outer surfaces and acting as an edge of said accumulator,
   wherein one of the outer surfaces of said accumulator includes at least one marking created by local heating of a material forming the marking, said marking being electrically conductive, said marking being a charge state monitoring device, said marking including a plurality of grooves forming a diffraction grating, said grooves deforming when the outer surface on which the grating is arranged deforms under an effect of discharge of said accumulator or of charge/discharge of said accumulator.

2. The accumulator according to claim 1, wherein said local heating of the material forming the marking removes the material.

3. The accumulator according to claim 1, wherein said local heating of the material forming the marking is performed by laser.

4. The accumulator according to claim 1, wherein said marking extends over at least any one of the outer surfaces of said accumulator.

5. The accumulator according to claim 4, wherein the marking extends over all of the outer surfaces of said accumulator.

6. The accumulator according to claim 3, wherein said local heating of the material by laser is performed so that the marking has a colour contrasting with the material of the surface to which said marking is applied.

7. The accumulator according to claim 3, wherein said local heating of material by laser is performed so that the marking has an identical colour to that of the material of the surface to which said marking is applied.

8. The accumulator according to claim 2, wherein said marking includes a plurality of grooves forming a diffraction grating creating an interference effect to give said marking a colour.

9. The accumulator according to claim 1, wherein said accumulator further includes a second marking, said marking being a decorative image.

10. The accumulator according to claim 1, wherein said accumulator further includes a second marking, said marking being an anti-counterfeit device.

11. The accumulator according to claim 10, wherein the anti-counterfeit device includes a combination of several recesses with different surface dimensions forming a unique arrangement.

12. The accumulator according to claim 10, wherein the anti-counterfeit device includes a combination of several recesses arranged parallel to each other, a space between two recesses and a width of said recesses being heterogeneous to form a unique arrangement.

13. The accumulator according to claim 1, wherein the accumulator further includes at least one non-electrically conductive marking.

14. The electronic apparatus including a closed case containing an electronic module, said case including a hatch closed by a hatch cover in which an accumulator to electrically power the electronic module can be arranged, wherein said accumulator is made according to claim 1.

15. The electronic apparatus including a closed case containing an electronic module, said case including a hatch closed by a hatch cover in which an accumulator to electrically power the electronic module can be arranged, wherein said accumulator is made according to claim 9.

16. The electronic apparatus including a closed case containing an electronic module, said case including a hatch closed by a hatch cover in which an accumulator to electrically power the electronic module can be arranged, wherein said accumulator is made according to claim 10.

17. The electronic apparatus according to claim 14, wherein the hatch cover or any other element of the case is made of a transparent material to allow the marking of said accumulator to be seen.

18. The electronic apparatus according to claim 14, wherein the case of said accumulator includes a decoration and the battery marking is made so that said decoration and said marking combine to form an assembly.

19. The accumulator according to claim 1, wherein the plurality of grooves are parallel to one another.

20. The accumulator according to claim 1, wherein the charge state monitoring device provides a visual indication of a state of charge.

* * * * *